June 23, 1964 R. F. GLORE 3,138,720

FERROMAGNETIC SENSING DEVICE

Filed July 30, 1962 3 Sheets-Sheet 1

INVENTOR
R. F. GLORE
BY
John K. Mullarney
ATTORNEY

INVENTOR
R. F. GLORE
BY John K. Mullarney
ATTORNEY

June 23, 1964 R. F. GLORE 3,138,720

FERROMAGNETIC SENSING DEVICE

Filed July 30, 1962 3 Sheets-Sheet 3

INVENTOR
R. F. GLORE
BY
John K. Mullarney
ATTORNEY

United States Patent Office 3,138,720

Patented June 23, 1964

3,138,720

FERROMAGNETIC SENSING DEVICE

Robert F. Glore, Middletown, N.J., assignor to Bell Telephone Laboratories, Incorporated, New York, N.Y., a corporation of New York Filed July 30, 1962, Ser. No. 213,423
6 Claims. (Cl. 307—88)

This invention relates to monitoring apparatus and, more particularly, to such apparatus employing ferromagnetic sensing devices for the supervision of telephone lines and trunks.

A device for monitoring the status of telephone lines and trunks is described in the copending application of J. A. Baldwin-H. F. May, Serial No. 26,758, filed May 4, 1960. Each device consists of a multiturn coil or coils mounted coaxially with an elongated ferromagnetic element. Two loops are threaded through two apertures in the ferromagnetic element. If a current pulse is applied to one loop, a similar pulse is induced in the other loop if the multiturn coil is not energized. If the coil is energized with sufficient current to saturate the ferromagnetic element a very low output will be obtained. Thus, if as the result of a subscriber lifting a handset a current is caused to flow through and thereby energize the multiturn coil, this "off-hook" condition will be recognized by the absence of a pulse on the output loop when the input loop is driven with a current pulse.

Since the ferromagnetic element is generally a relatively brittle ferrite and since line surges or lightning strikes may burn out the energizing coil or coils despite the use of conventional protection networks, it is highly desirable that the sensing or monitoring device be embodied in a structure which is readily accessible and easily replaceable. A prior art device which meets these objectives is described in the copending application of H. J. Wirth, Jr., Serial No. 78,002, filed December 23, 1960. This prior art device, however, is not quite as flexible as one might desire. For example, since such a device may possibly be used in various types of circuits, each of which requires a different sensitivity than the other, it is desirable to have a device whose sensitivity can be readily changed. Unfortunately, to increase or decrease the sensitivity of this prior art device is not easily and readily accomplished.

Since the energizing coils of a ferromagnetic sensing device are frequently activated by contacts which may be damaged by the inductive effect of the coils on the current when the contacts are opened, a protection network which reduces contact arc-over is generally desirable. Now, inasmuch as it is likely that such a contact protection network will also be damaged when the coils are damaged, it is advantageous to incorporate the protection network as a part of a readily replaceable unit. The prior art devices, however, make no provision for the inclusion of a contact protection network as a part of such a replaceable unit.

An object of the present invention is to provide a ferromagnetic sensing device wherein sensitivity may be readily altered after the device has been completely assembled.

Another object of this invention is to incorporate protective network means as an integral part of a readily replaceable sensing unit.

Further objects of the invention are to provide ferromagnetic sensing devices that are readily assembled, extremely compact, flexible in use, and easily replaced.

These and other objects are attained in accordance with the present invention wherein a ferromagnetic sensing device (hereinafter called ferrod) uses a coil spool design which allows an attachable magnetic return path element to be readily mounted, if desired, after the device has been completely assembled to thereby alter the sensitivity of the same; wherein even further variations in sensitivity can be obtained by altering the reluctance of the magnetic return path; wherein two ferrods are mounted in tandem to thus reduce the required rack area for an array of ferrods; and wherein space or separation is provided between the tandem ferrods to minimize magnetic interaction therebetween, which separation is judiciously utilized as a space in which to mount contact protection networks.

Other objects and many advantages of the present invention will be readily appreciated as the invention becomes better understood by reference to the following detailed description when considered in connection with the accompanying drawings in which.

Figure 1:
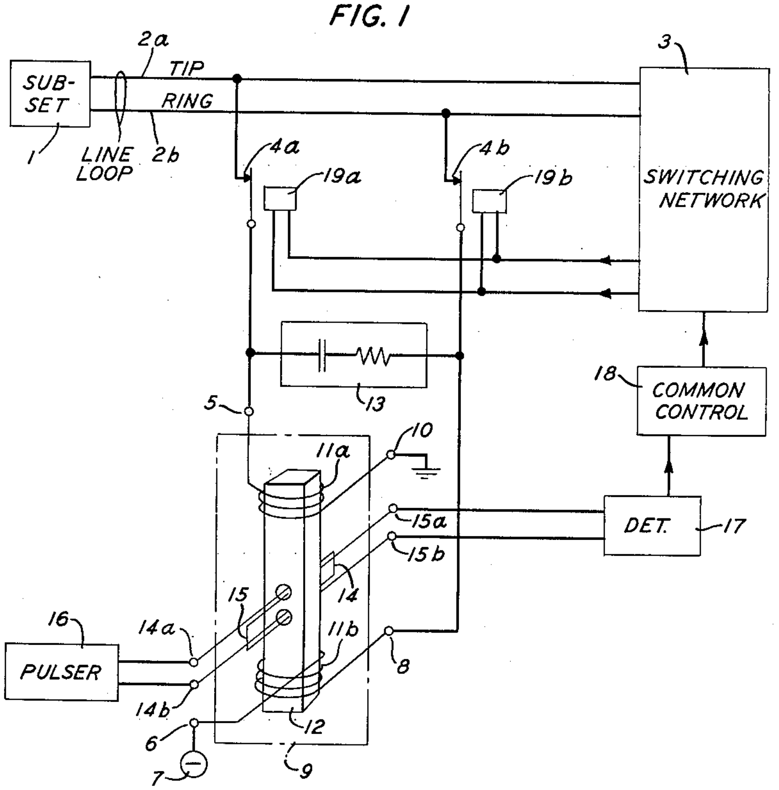
FIG. 1 is a schematic representation of a circuit which illustrates a typical use of a conventional ferrod device for monitoring telephone lines.

Referring now to the drawings, FIG. 1 is a schematic representation of a circuit which illustrates a typical use of a ferromagnetic sensing device to determine the status of a telephone line. Subset 1 is conventionally connected by transmission lines 2*a* and 2*b* to the switching network 3. Each side of the transmission line is also connected through one of the normally closed contacts 4*a* and 4*b* to terminal points 5 and 8 ferrod (ferromagnetic sensing device) 9. Lifting the handset from subset 1 will allow the switchhook of subset 1 to establish continuity between points 5 and 8 through normally closed contacts 4*a* and 4*b* and transmission lines 2*a* and 2*b* so that current will flow from point 10, which is connected to ground potential, through energizing coils 11*a* and 11*b* to point 6 which is connected to minus potential source 7. Energizing coils 11*a* and 11*b* are mounted coaxially with ferromagnetic element 12. Sufficient current in these energizing coils will saturate ferromagnetic element 12 and inhibit the pulses from pulser 16, which is connected to drive loop 14, from coupling through to read loop 15, which is connected to detector 17. Hence, if the handset of subset 1 is in the "on-hook" condition, the current is not present in the energizing coils 11*a* and 11*b* and the pulses will not be inhibited from passing to the detector; whereas, the "off-hook" condition, which is brought about by the subscriber lifting the handset, will be recognized by a no pulse condition at the detector.

An indication by detector 17 via common control 18 to switching network 3 that the subscriber desires service will cause switching network 3 to supply dial tone over transmission lines 2*a* and 2*b* and to activate coils 19*a* and 19*b* of normally closed contacts 4*a* and 4*b*; as a result of said coil activation, ferrod 9 is disconnected from transmission lines 2*a* and 2*b*. The interruption of the energizing current which occurs when contacts 4*a* and 4*b* open would normally cause damage to these contacts as a result of the arc-over caused by the inductive effect of energizing coils 11*a* and 11*b* on the current. In order to reduce this arc-over, protection network 13 is connected between terminal points 5 and 8 of ferrod 9.

Figure 2:
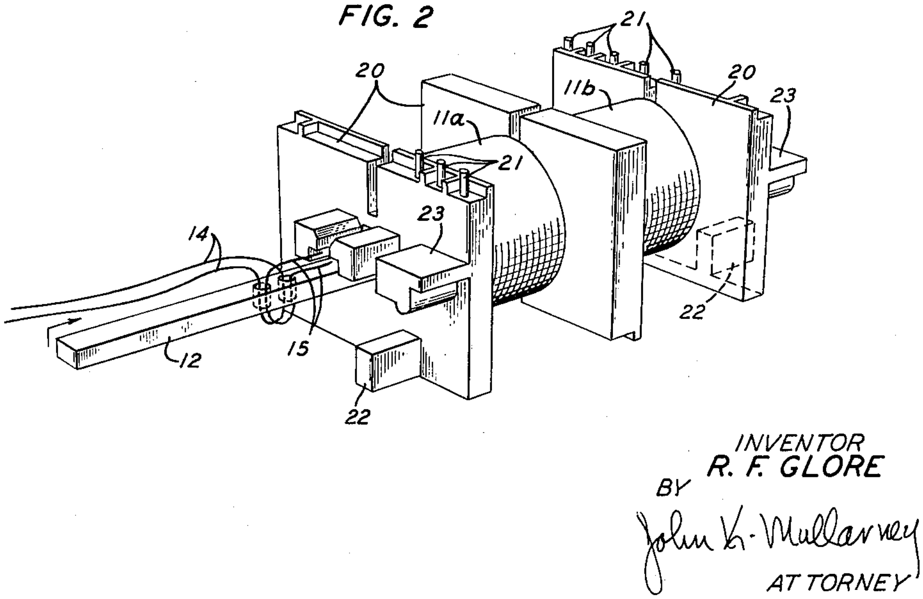
FIG. 2 is a perspective view of a coil spool design in accordance with the invention, and the relation of the same to the ferromagnetic element to which interrogation loops are coupled.

Referring now to the structural showing of FIG. 2, coil spool 20 on which energizing coils 11*a* and 11*b* are wound is shown with ferromagnetic element 12 only partially inserted into the coaxial channel of the same in order to illustrate the manner in which the drive loop 14 and the read loop 15 are coupled through two apertures the ferromagnetic element. The wire ends of energizing coils 11*a* and 11*b* are connected to preselected stiff wire terminals 21, which are inserted or molded at predetermined locations in the end flanges of coil spool 20. The wire ends of read loop 14 and drive loop 15 are brought out from opposite ends of the coaxial channel and are then attached (e.g. wrapped) to preselected stiff wire terminals 21. This latter connection not only provides terminals through which the read and drive loops will be connected to the remainder of the apparatus, but also provides a temporary physical restraint on ferromagnetic element 12 during the remainder of the assembly (i.e., element 12 is prevented from shifting position axially). Protrusions 22 and 23 which are integral molded parts of the end flanges of coil spool 20 will be explained in a forthcoming discussion in connection with FIG. 5.

The device which results from completely inserting ferromagnetic element 12 and attaching the end wires of the loops and coils to wire terminals 21 is electrically equivalent to the network designated as ferrod 9 in the schematic representation of FIG. 1. Such a device can, of course, be electrically connected, through wire terminals 21, into a circuit as shown in FIG. 1 and used to monitor the status of a single telephone line. In a central office, however, several thousand telephone lines may require monitoring and a device as described which requires connection through wire terminals 21 is not obviously compatible with other such devices for easy assembly into an array. Since thousands of ferrods are generally required, it is desirable to have each ferrod in the array of ferrods require as little frontal access area of the "bay" as possible. The smallest area presented by the above described ferrod is an area substantially equal to that of an end flange of coil spool 20. The area per ferrod which is required can be reduced by nearly half, however, by mounting two ferrods in tandem in accordance with the invention.

Figures 3, 4:
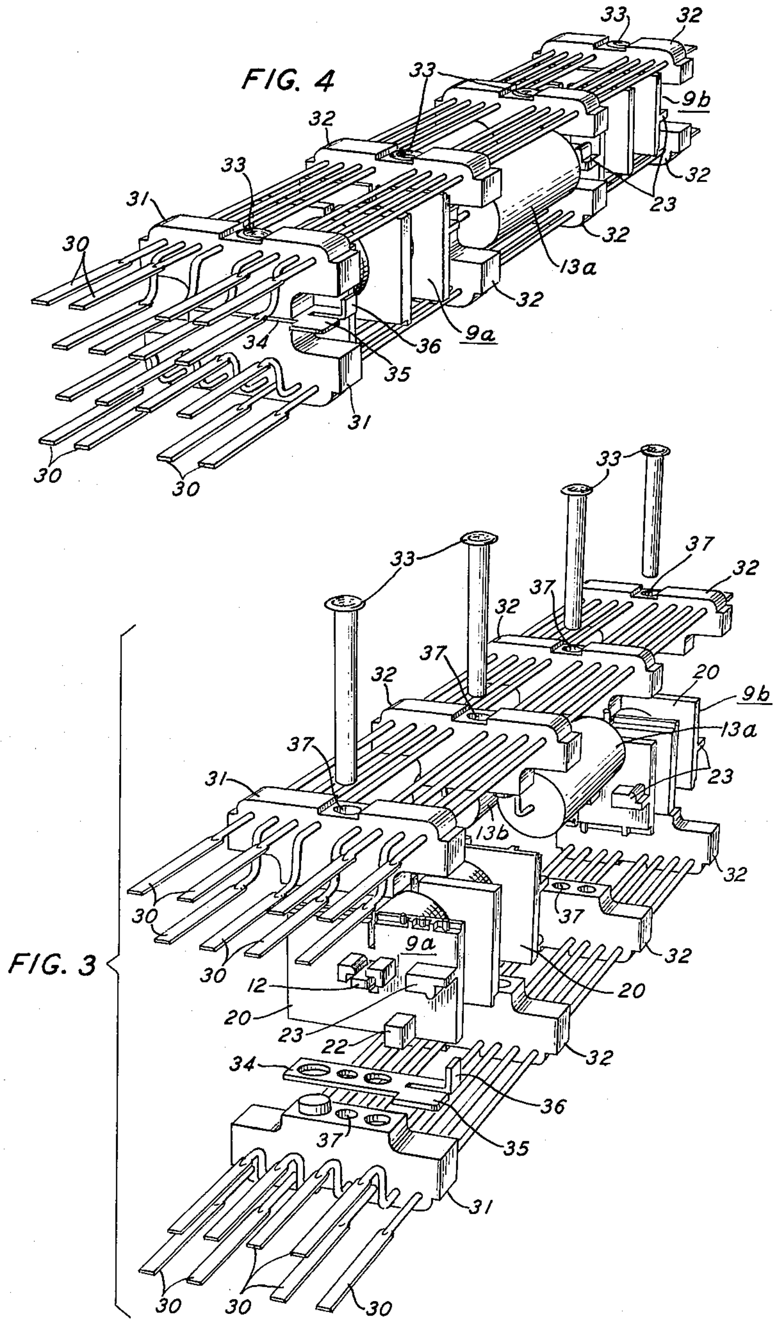
FIG. 3 is an exploded perspective view of a pair of tandem ferrod units and two interposed protection networks, all in accordance with the present invention.
FIG. 4 is a perspective representation of the dual ferrod apparatus of FIG. 3 when completely assembled.

Referring now to FIG. 3, the exploded view of a structural arrangement wherein two ferrods are mounted in tandem is shown. The structure is composed of two identical wire ladder assemblies which are individually made up of eight conducting wire rods 30 which have been molded or inserted into four nonmagnetic, nonconducting brattices 31 and 32. The two identical wire ladder assemblies are fastened together by elongated eyelets 33 which pass through center holes 37 of the brattices 31 and 32. The brattices 31, which appear in the forefront in the figure, are dimensionally different from brattices 32 since metal catch 34 is sandwiched between brattices 31; whereas the complementary upper and lower brattices 32 abut directly with no intervening metal catch. The purpose of metal catch 34 will be discussed hereinafter in connection with FIG. 7.

The positioning and separation of wire rods 30 are chosen so that each wire rod will mate (i.e., contact) with at least one wire terminal 21 of ferrods 9*a* and 9*b* after the wire ladder assemblies have been fastened together. Soldering the wire terminals 21 to the mating wire rods 30 not only provides electrical connection between wire rods 30 and the read loops, drive loops, and energizing coils of ferrods 9*a* and 9*b*, but also provides an agency whereby the ferrods 9*a* and 9*b* are held in place within their respective compartments of the dual ferrod assembly. The leading ends of wire rods 30 are pre-flattened and separated from each other by bending as shown in FIG. 3 in order to facilitate wire wrapping the conductors which connect the two ferrods to the remainder of the circuit shown in FIG. 1.

The pair of tandem ferrods should not be placed immediately adjacent each other, or harmful magnetic interaction might result. To this end, the structure of FIG. 3 is divided into three sections or compartments, defined by the brattices, with the ferrods 9*a* and 9*b* mounted in the end compartments. In addition to achieving the desired separation between ferrods, the center compartment is also advantageously used as a place in which to mount in a side-by-side fashion contact protection networks 13*a* and 13*b* heretofore described. The protection networks each comprise an encapsuled resistance and capacitance combination.

A pictorial representation of the dual ferrod structure when completely assembled is shown in FIG. 4. An especially significant feature of this structure and its assembly is that the exact same components and method of assembly are used in the ferrods for line scanners as in the more sensitive ferrods for trunk scanners. To obtain the increased sensitivity which is required in the ferrods to be used in trunk scanners and elsewhere, a U-shaped magnetic return path element is added to either or each ferrod after the dual ferrod structure is completely assembled. In FIG. 4, it should be noted that the two opposite sides of the coil spool which do not contain the wire terminals 21 are open to the outside with on obstruction from wire rods 30. It is into one of these open sides of the structure that the magnetic return path element or elements is inserted.

Figure 5:
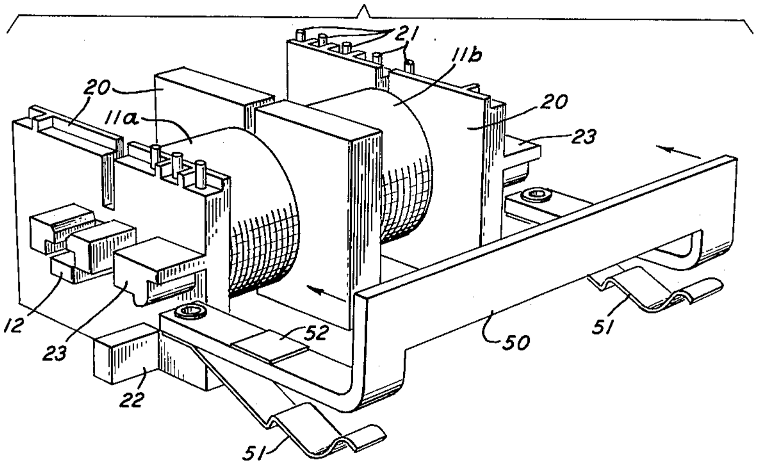
FIG. 5 illustrates an attachable U-shaped magnetic return path element and its position relative to a coil spool immediately prior to its being snapped into the position shown in FIG. 6.

Referring now to FIG. 5, a ferrod assembly is shown with a U-shaped magnetic return path element 50 positioned for attachment to the coil spool 20. Attached to each leg of the return path element 50 is a preformed leaf-like spring 51. When magnetic return path element 50 is inserted into the assembly, by movement of the same in the direction of the arrows, spring elements 51 will seat themselves on protrusions 22 and in so doing press the legs of the return path element 50 against the ends of ferromagnetic element 12 and protrusions 23, as shown more clearly in FIG. 6. Integrally mounted on each leg of return path element 50, at the point proximate to the overlying ends of ferromagnetic element 12, is a nonmagnetic spacer shown as 52. Variations in the thickness of nonmagnetic spacers 52 will vary the spacing between the legs of element 50 and the ferromagnetic element 12, and as will be appreciated by those in the art this in turn will substantially change or vary the reluctance of the magnetic return path. Hence, the insertion of a magnetic return path element with a spacer of greater thickness will cause increased current to be needed in energizing coils 11*a* and 11*b* in order to saturate ferromagnetic element 12. Alternatively, the insertion of a magnetic return path element with a spacer of lesser thickness will cause less current to be needed in energizing coils 11*a* and 11*b*. Consequently, the sensitivity of a ferrod is initially and significantly increased by the addition of a U-shaped magnet return path element, and further variations and adjustments on this increased sensitivity can be made by changing the reluctance of the path in the described manner.

The length of spacers 52, i.e., their extension along the legs of element 50, is not at all critical. All that is necessary in this regard is that the same be interposed between the said legs and the ends of ferromagnetic element 12 when the return path element is attached to the coil spool. The aforementioned changes in return path reluctance can, of course, also be acomplished by reducing the thickness of the spacers, by filing or the like, from a given maximum thickness.

Figure 6:
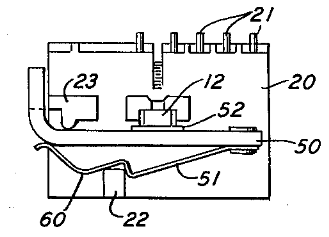
FIG. 6 is an end view of a coil spool and a ferromagnetic element, with the aforementioned magnetic return path element mounted in place.

The return path element 50 is easily removed from the coil spool by manual pressure on the curved portions 60 of each spring (see FIG. 6). This pressure will cause the notches of the preformed springs to clear or rise above the protrusions 22 and the element 50 can then be withdrawn.

Figure 7:
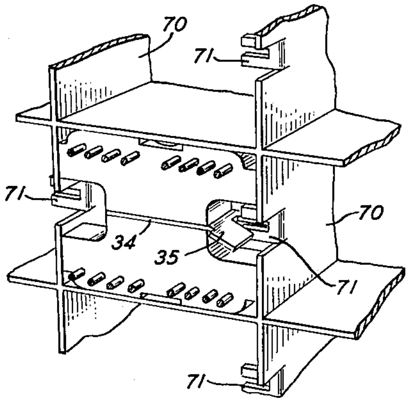
FIG. 7 is an illustration of the manner in which the assembled ferrod apparatus is mounted in a rack or frame.

As stated previously, a large number of dual ferrods will generally be used in a single location. The dual ferrods can be positioned and magnetically shielded from each other by mounting each dual ferrod in the rectangular cell of a honeycomb-like grouping of such cells composed of intersecting vertical and horizontal planes or sheets of magnetic shielding material. Referring now to FIG. 7, a sectional view of a rectangular cell with a dual ferrod in its mounted position is shown. The ends of wire rods 30 have been removed in FIG. 7 in order to more clearly illustrate the method of securing the ferrod within its cell.

A U-shaped metal tab 71 is punched out of each section of each vertical plane 70 at one end of the rectangular cell and bent, as shown in FIG. 7, so as to be in a vertical plane perpendicular to vertical plane 70 from which it was punched. The dual ferrod structure, is slid into the end of the rectangular cell opposite that of metal tab 71 until the leading edge 35 of metal catch 34 passes between the legs of U-shaped metal tab 71 and is stopped by seating upright edge 36 against the uppermost leg of metal tab 71. Leading edge 35 is then bent as shown in FIG. 7 so as to prevent the dual ferrod structure from backing out of its rectangular cell. Consequently, metal catch 34 firmly but easily holds the dual ferrod structure in place and, in so doing, prevents movements of the structure from introducing stresses and strains into the wrapped connections which are made to the ends of wire rods 30.

It is to be understood that the above desrcibed arrangement is illustrative of the application of the principles of the present invention and numerous modifications or alterations may be devised by those skilled in the art without departing from the spirit and scope of the invention.

What is claimed is:

1. A replaceable ferromagnetic assembly for monitoring the status of telephone lines and trunks comprising first and second ferromagnetic sensing devices each including an elongated coil spool of insulating material having a coaxial channel therein, an elongated ferromagnetic element mounted in said channel and having at least two apertures, a drive loop coupled to said ferromagnetic element through said two apertures, a read loop also coupled to said ferromagnetic element through said two apertures and coil means mounted coaxially on said coil spool for magnetically saturating said ferromagnetic element, said first and second ferromagnetic sensing devices being mounted in tandem with a space therebetween to substantially eliminate magnetic interaction, and a pair of contact protection networks for said sensing devices mounted side-by-side in said space.

2. A ferromagnetic sensing device comprising an elongated coil spool of insulating material having a coaxial channel therein, an elongated ferromagnetic element mounted in said channel and having at least two apertures, a drive loop coupled to said ferromagnetic element through said two apertures, a read loop also coupled to said ferromagnetic element through said two apertures, coil means mounted coaxially on said coil spool for magnetically saturating said ferromagnetic element, and a U-shaped magnetic return path element detachably mounted on said coil spool with the legs of said U-shaped magnetic return path element positioned adjacent respective ends of said ferromagnetic element.

3. A ferromagnetic sensing device comprising an elongated coil spool of insulating material having a coaxial channel therein, an elongated ferromagnetic element mounted in said channel and having at least two apertures, a drive loop coupled to said ferromagnetic element through said two apertures, a read loop also coupled to said ferromagnetic element through said two apertures, coil means mounted coaxially on said coil spool for magnetically saturating said ferromagnetic element, a U-shaped magnetic return path element detachably mounted on said coil spool with the legs of said magnetic return path element positioned adjacent respective ends of said ferromagnetic element, and nonmagnetic spacers of preselected thickness respectively mounted on said legs in positions proximate to the ends of said ferromagnetic element for determining the gaps between said legs and said ferromagnetic element.

4. A ferromagnetic sensing device as defined in claim 3 wherein said coil spool comprises integral end flanges having outwardly extending protrusions thereon, a pair of preformed leaf springs each attached at one of the ends thereof to respective legs of said U-shaped magnetic return path element, said leaf springs being formed with notches therein which resiliently engage protrusions on said end flanges to releasably hold said return path element in position, said leaf springs serving to bias the spacers mounted on each of said legs into contact with the ends of said ferromagnetic element.

5. In a replaceable ferromagnetic assembly for monitoring the status of telephone lines and trunks wherein first and second ferromagnetic sensing devices each include an elongated coil spool of insulating material having a coaxial channel therein, an elongated ferromagnetic element mounted in said channel and having at least two apertures, a drive loop coupled to said ferromagnetic element through said two apertures, a read loop also coupled to said ferromagnetic element through said two apertures, and coil means mounted coaxially on said coil spool for magnetically saturating said ferromagnetic element, said first and second ferromagnetic sensing devices being mounted in tandem with a space therebetween to substantially eliminate magnetic interaction; the combination herewith of a U-shaped magnetic return path element adapted to be detachably mounted on either coil spool with the legs of said magnetic return path element positioned adjacent respective ends of the related ferromagnetic element, and nonmagnetic spacers of preselected thickness respectively mounted on said legs in positions proximate to the ends of said ferromagnetic element for determining the gaps between said legs and said ferromagnetic element.

6. In the assembly as defined in claim 5 wherein each coil spool comprises integral end flanges having outwardly extending protrusions thereon; a pair of preformed leaf springs each attached at one of the ends thereof to respective legs of said U-shaped magnetic return path element, said leaf springs being formed with notches therein which resiliently engage protrusions on said end flanges to releasably hold said return path element in position, said leaf springs serving to bias the spacers mounted on each of said legs into contact with the ends of said ferromagnetic element.

No references cited.